US009251524B2

(12) United States Patent
Moritz et al.

(10) Patent No.: US 9,251,524 B2
(45) Date of Patent: Feb. 2, 2016

(54) SYSTEM AND METHODS FOR UPDATING USER PROFILES AND PROVIDING SELECTED DOCUMENTS TO USERS

(75) Inventors: Simon Moritz, Solna (SE); Jonas Bjork, Stockholm (SE); Richard Carlsson, Stockholm (SE); Hjalmer Olsson, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1028 days.

(21) Appl. No.: 12/626,124

(22) Filed: Nov. 25, 2009

(65) Prior Publication Data

US 2011/0125767 A1    May 26, 2011

(51) Int. Cl.
G06F 7/00      (2006.01)
G06F 17/30     (2006.01)
G06Q 30/02     (2012.01)

(52) U.S. Cl.
CPC ............ *G06Q 30/02* (2013.01); *G06Q 30/0277* (2013.01)

(58) Field of Classification Search
CPC .............. G06Q 30/02; G06Q 30/0277; G06Q 30/0202; G06Q 30/0273
USPC ......... 707/600, 607, 608, 610, 705, 750–780, 707/802, 821
See application file for complete search history.

(56) References Cited

U.S. PATENT DOCUMENTS

| | | | | |
|---|---|---|---|---|
| 5,619,709 A * | 4/1997 | Caid et al. | ...................... | 715/209 |
| 5,778,362 A * | 7/1998 | Deerwester | | |
| 5,835,087 A * | 11/1998 | Herz et al. | ...................... | 715/810 |
| 6,615,208 B1 * | 9/2003 | Behrens et al. | ................ | 707/754 |
| 6,996,572 B1 * | 2/2006 | Chakrabarti et al. | ......... | 715/205 |
| 7,630,976 B2 * | 12/2009 | Zhang et al. | | |
| 2002/0052873 A1 * | 5/2002 | Delgado et al. | ..................... | 707/7 |
| 2002/0107853 A1 * | 8/2002 | Hofmann et al. | .................. | 707/7 |
| 2004/0034652 A1 * | 2/2004 | Hofmann et al. | ............. | 707/102 |
| 2006/0041548 A1 * | 2/2006 | Parsons et al. | ..................... | 707/5 |
| 2006/0156222 A1 * | 7/2006 | Chi et al. | ....................... | 715/512 |
| 2006/0242129 A1 * | 10/2006 | Libes et al. | ........................ | 707/3 |
| 2006/0248059 A1 * | 11/2006 | Chi et al. | .......................... | 707/3 |
| 2007/0179924 A1 * | 8/2007 | Zhong et al. | .................... | 706/55 |
| 2008/0109454 A1 * | 5/2008 | Willse et al. | .................. | 707/100 |
| 2008/0189232 A1 * | 8/2008 | Dunning et al. | ................ | 706/45 |
| 2008/0291122 A1 * | 11/2008 | Smith et al. | ...................... | 345/55 |
| 2009/0019033 A1 | 1/2009 | Lee et al. | | |
| 2010/0049770 A1 * | 2/2010 | Ismalon | ........................ | 707/765 |
| 2010/0094904 A1 * | 4/2010 | Jandhyala | ...................... | 707/791 |

(Continued)

OTHER PUBLICATIONS

Latent Semantic Analysis, Wikipedia, http://en.wikipedia.org/wiki/Latent_semantic_analysis, Last Modified Nov. 18, 2009, 5 pages.

(Continued)

*Primary Examiner* — Taelor Kim
(74) *Attorney, Agent, or Firm* — Patent Portfolio Builders, PLLC (57) ABSTRACT

The present invention provides an improved recommender system. In some embodiments, the recommender system automatically builds a user profile for a user based solely on the action or actions the user takes with respect to certain documents and the contents of the documents. That is, the profile is based on implicit ratings. In addition to maintaining a user profile for each user, each document in a set of documents will have its own document profile, which is also referred to as a document vector. Advantageously, in some embodiments, the user profile will consist of the same attributes as the document vectors. This advantageous feature enables the recommender system to compare users and documents in order to generate recommendations.

21 Claims, 8 Drawing Sheets

(56) References Cited

U.S. PATENT DOCUMENTS

2011/0035272 A1\* 2/2011 Bhatt et al. ................. 705/14.42
2011/0072052 A1\* 3/2011 Skarin et al. .................. 707/794

OTHER PUBLICATIONS

Office Action issued in corresponding European Patent Application No. 06 813 087.1 on Feb. 22, 2012, 4 pages.

Examination Report issued in corresponding New Zealand Patent Application No. 588714 on Feb. 15, 2012, 2 pages.

Loh, Stanley, et al., "Comparing Keywords and Taxonomies in the Representation of Users Profiles in a Content-Based Recommender System", Proceedings of the 2008 ACM Symposium on Applied Computing, Fortaleza, Ceara, Brazil, Mar. 16-20, 2008, pp. 2030-2034.

\* cited by examiner

SYSTEM AND METHODS FOR UPDATING USER PROFILES AND PROVIDING SELECTED DOCUMENTS TO USERS

TECHNICAL FIELD

The invention relates to systems and methods for updating user profiles and providing documents to users.

BACKGROUND

The amount of content available today is tremendous. This has become known as the problem of "information overload." Tools have been developed to help solve this problem. One such tool is known as a "recommender system." A recommender system is a system that can be used to intelligently select from a candidate set of documents a particular document to present to a particular user and/or to select from a candidate set of users a particular user to receive a particular document.

One method used by some recommender systems to select documents/users is referred to as "collaborative filtering." Collaborative filtering is a method of filtering information among data sources and user profiles in a collaborative manner. The first automated collaborative filtering system was introduced by GROUPLENS™ in 1994 and was a recommendation system for news articles. The main task in collaborative filtering is to predict a user's rating (e.g., preference) for a certain document based on other users' ratings. The ratings can be either explicit or implicit. A user's ratings are matched against the database to find other users with similar rating patterns. These other users are referred to as "neighbors." For those items that the user has not rated, the recommender system may recommend one or more items from the subset of those items that are liked by the user's neighbors.

AMAZON.COM™ was one of the first to successfully use a recommender system in an online store. Today, many online stores have at least co-occurrence recommendations such as: "customers who bought this product also bought these products." There are however some limitations of recommendation systems. A challenge is to improve both quality and scalability. It is a challenge because better quality usually implies the need for more calculations and/or more data, which leads to a less scalable system.

SUMMARY

In one aspect, the invention provides an improved recommender system that automatically builds a user profile for a user based solely on the action or actions the user takes with respect to certain documents and the contents of the documents. That is, the profile is based on implicit ratings. In addition to maintaining a user profile for each user, each document in a set of documents will have its own document profile, which is also referred to as a document vector. Advantageously, in some embodiments, the user profile will consist of the same attributes as the document vectors. This advantageous feature enables the recommender system to compare users and documents in order to generate recommendations.

Accordingly, in one aspect, the invention provides a method for updating and/or creating a profile associated with a user of a client device. The method may be performed by a document server that includes a recommender system. In some embodiments, this method begins with the step of transmitting, from the document server to the user, a document containing a set of one or more terms (the document may be an advertisement or another document). In some embodiments, the document contains not only the set of terms but also a second set of terms. Next, the recommender system receives information identifying an action or actions the user took with respect to the document. Next, in response to receiving the information, the recommender system determines, for each term included in the set of terms, a value to associate with the term. The value be a function of the user's action or actions. More specifically, in some embodiments, the value will be a function of the user's action or actions and the number of times the term appears in the document. Hence, the recommender system establishes a set of term/value pairs, where each pair consists of one of the terms and its associated value. Next, the set of term/value pairs is stored in the user's profile.

In some embodiments, the user's profile contains a value associated with a particular term that is included in the set of terms prior to the document being transmitted to the user. In such a case, the value determined for the particular term is a function of the value contained in the profile (v1), a value (a) corresponding to the user's action or actions, and the number of times (n) the term appears in the document. For example, the step of determining the value for the particular term may comprise computing (v1)+(a)(n).

The information identifying the user's action or actions may indicate that the user disregarded the document or may indicate that the user initially disregarded the document but later opened the document. In some embodiments, the information identifying the user's action or actions may be a value, and the value may be mapped to a particular action or actions, using, for example, a look-up table. In some embodiments, the step of transmitting the document to the user comprises transmitting an e-mail containing the document to an e-mail address associated with the user, while in other embodiment the step comprises transmitting the document directly to the client device.

In another aspect, the present invention provides a method for providing a document to a user. The method may be performed by a document server that includes a recommender system. In some embodiments, the method begins with the recommender system updating a user vector. The updating step may include: (a) receiving information identifying an action or actions the user took with respect to a particular document that contains a set of one or more terms, (b) computing a value for each term included in the set of terms in response to receiving the information, each of said values being a function of the user's action or actions, and (c) storing the computed values in a user vector such that each said value is associated with its corresponding term. Next, the recommender system generates a reduced user vector from the user vector. Next, the recommender system uses the reduced user vector to select a document from a set of candidate documents. Next, the document server transmits to the user the selected document.

The step of using the reduced user vector to select a document from the set of candidate documents may include: obtaining a first reduced document vector representing a first document from the set of candidate documents; computing a first similarity value representing the similarity between the reduced user vector and the first reduced document vector; obtaining a second reduced document vector representing a second document from the set of candidate documents; computing a second similarity value representing the similarity between the reduced user vector and the second reduced document vector; and comparing the first similarity value with the second similarity value.

In some embodiments, the step of generating a reduced user vector comprises computing $xU_k$, wherein x is the updated user vector and $U_k$ is a column matrix. $U_k$ preferably contains the k eigenvectors of a matrix U, which is generated prior to generating the reduced user vector. The step of generating the matrix U may include: generating a matrix M that describes term correlations within all of the candidate documents; and deriving U from M.

In another aspect, the invention provides a document serving system for creating and/or updating a user vector associated with a user. The system may include: a data processing system; a data storage system accessible to the data processing system; and a network interface coupled to a network. Preferably, the data processing system is configured to transmit to a user, via the network interface and the network, a document containing a set of one or more terms. The data processing system is also configured to receive information identifying an action or actions the user took with respect to the document. The data processing system is also configured to establish a set of term/value pairs in response to receiving the information, where each said pair consists of a term and an associated value. The data processing system is configured to establish the set of term/value pairs by determining, for each term included in the set of terms, a value to associate with the term, the value being a function of the user's action or actions. The data processing system is also configured to store in the data storage system the set of term/value pairs such that the set of term/value pairs is associated with the user.

In yet another aspect, the invention provides a document serving system for providing documents to a user. The system includes a data processing system, a data storage system accessible to the data processing system, and a network interface coupled to a network. The data processing system is configured to update a user vector associated with the user. The data processing system is configured to update the user vector by: (a) receiving information identifying an action or actions the user took with respect to a particular document that contains a set of one or more terms, (b) computing a value for each teem included in the set of terms in response to receiving the information, each of said values being a function of the user's action or actions, and (c) storing the computed values in the user vector such that each said value is associated with its corresponding term, thereby updating the user vector. The data processing system is also configured to generate a reduced user vector from the updated user vector. The data processing system is also configured to use the reduced user vector to select a document from a set of candidate documents. The data processing system is also configured to transmit the selected document to the user via the network interface.

Preferably, the data processing system is configured to use the reduced user vector to select a document from the set of candidate documents by: obtaining a first reduced document vector representing a first document from the set of candidate documents, computing a first similarity value representing the similarity between the reduced user vector and the first reduced document vector, obtaining a second reduced document vector representing a second document from the set of candidate documents, computing a second similarity value representing the similarity between the reduced user vector and the second reduced document vector, and comparing the first similarity value with the second similarity value.

In yet another aspect, the invention provides a computer program comprising computer readable code means which when executed by a processor causes the processor to perform certain steps. In some embodiments, these certain steps may include: (a) using a network interface to transmit to a user a document containing a set of one or more terms; (b) in response to receiving information identifying an action or actions the user took with respect to the document, determining, for each term included in the set of terms, a value to associate with the term, said value being a function of the user's action or actions, thereby establishing a set of term/value pairs, where each said pair consists of one of said terms and its associated value; and (c) storing the set of term/value pairs in a profile associated with the user.

In other embodiments, these certain steps may include: (1) updating a user vector, the updating step comprising (a) receiving information identifying an action or actions the user took with respect to a particular document that contains a set of one or more terms, (b) in response to receiving the information, computing a value for each term included in the set of terms, each of said values being a function of the user's action or actions, and (c) storing the computed values in the user vector such that each said value is associated with its corresponding term; (2) generating a reduced user vector from the user vector; (3) using the reduced user vector, select a document from a set of candidate documents; and (4) using a network interface to transmit to the user the selected document. In some embodiments, the step of using the reduced user vector to select a document from the set of candidate documents may include: obtaining a first reduced document vector representing a first document from the set of candidate documents; computing a first similarity value representing the similarity between the reduced user vector and the first reduced document vector; obtaining a second reduced document vector representing a second document from the set of candidate documents; computing a second similarity value representing the similarity between the reduced user vector and the second reduced document vector; and comparing the first similarity value with the second similarity value.

The above described computer program may be stored in a computer readable means to form a computer program product.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
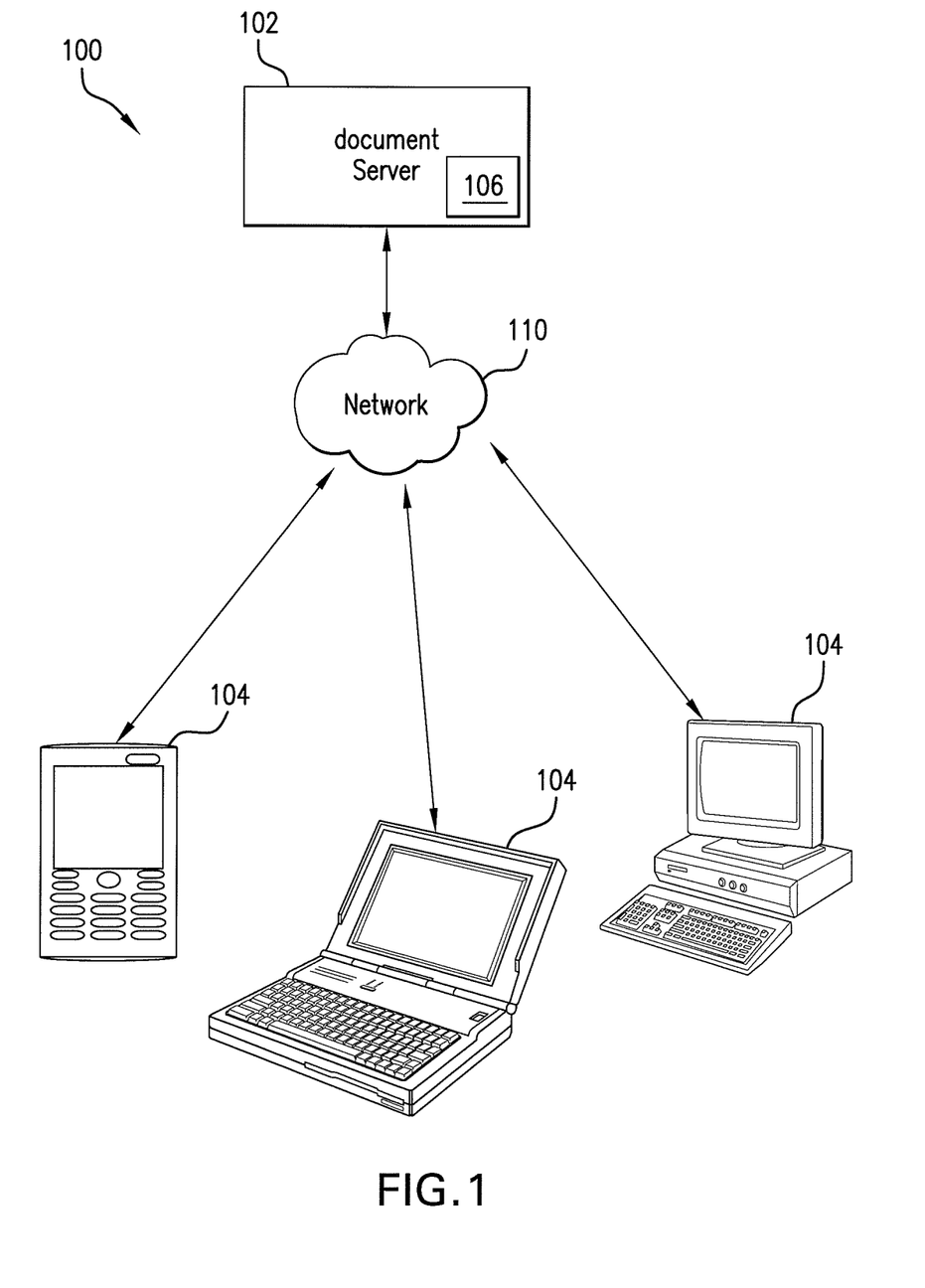
FIG. 1 illustrates a system according to some embodiments of the invention.

Referring now to FIG. 1, FIG. 1 illustrates a system 100 having a document serving system 102 (a.k.a., "document server 102" or "server 102") for serving documents to be consumed by user's of client devices 104. As used herein, the term "document" means any item of information or set of information. Examples of documents include, but are not limited to, news articles, advertisements, web pages, books, and product information. Accordingly, document server 102 may be or include any one of the following: a news server, an advertising server, a web server, etc.

As shown in FIG. 1, sever 102 and client devices 104 may be connected to the same network 110 (e.g., the Internet or a service provider's communications network). Document server 102, as its name implies, functions to provide documents, such as advertisements or other documents, to users. Document server 102 may consist of a single, stand-alone server computer or a set of server computers that may be co-located or geographically dispersed.

As further shown, document server 102 includes a recommender system 106. In some embodiments, recommender system 106 functions to select which documents will be provided to which users. Additionally or alternatively, recommender system 106 may function to select which users will be provided with a particular document.

Advantageously, recommender system 106, in some embodiments, is configured to automatically build a user-profile for any particular user based solely on the action or actions the user takes with respect to certain documents provided to the user by document server 102. In some embodiments, the user-profile will consist of the same attributes as the documents themselves. Thus, it will be possible to compare users and documents in order to generate recommendations, much in the same way that a search engine compares a query to documents in its database.

Figure 2:
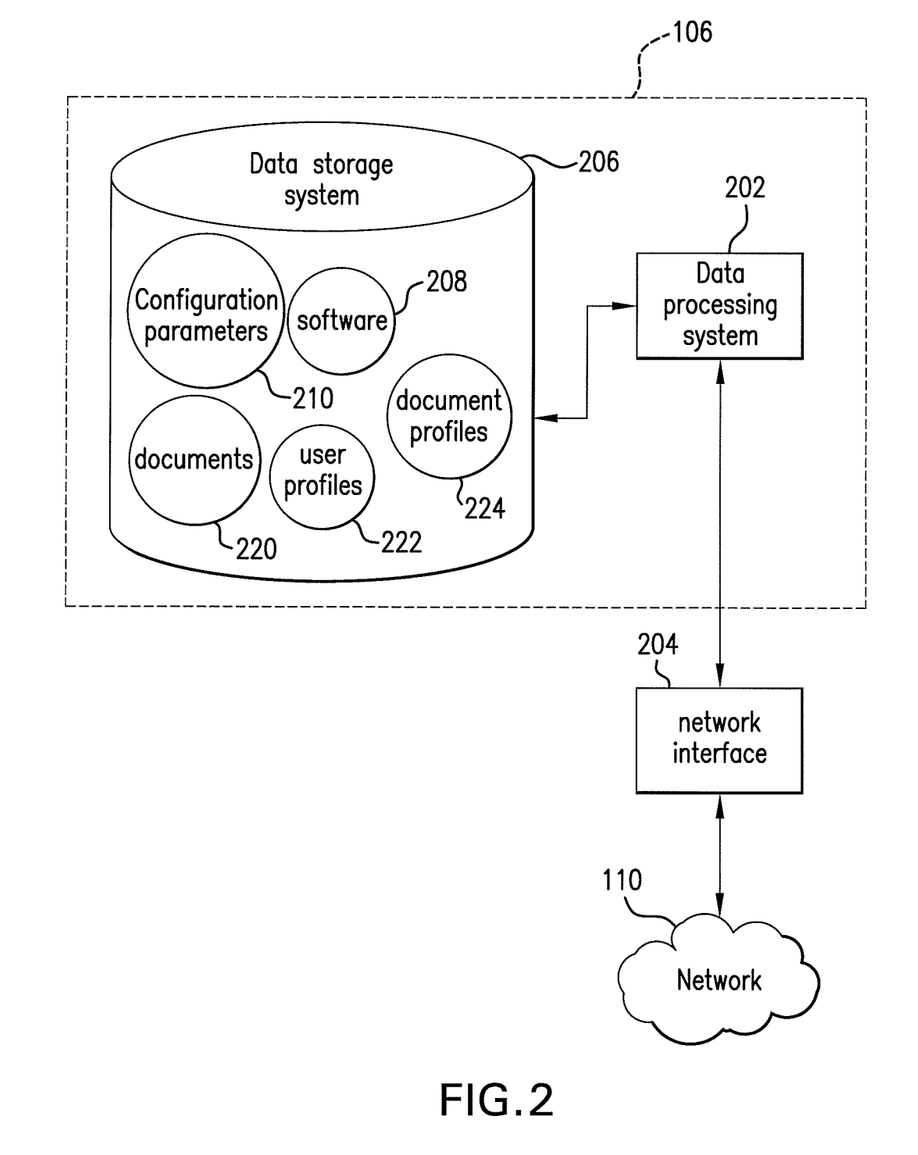
FIG. 2 is a functional block diagram of a recommender system according to some embodiments of the invention.

Referring now to FIG. 2, FIG. 2 illustrates a functional block diagram of recommender system 106 according to some embodiments. As shown in FIG. 2, recommender system 106 may comprise a data processing system 202 (e.g. one or more microprocessors, one or more integrated circuits, such as an application specific integrated circuit (ASIC), Field-programmable gate arrays (FPGAs), etc. and any combination of these), a data storage system 206 (e.g. one or more non-volatile storage devices) and computer program 208 (i.e., software) stored on the storage system 206 For example, the computer program 208 may be stored using a computer readable means, such as, but not limited to magnetic media (e.g., a hard disk), optical media (e.g., a DVD), memory devices (e.g., random access memory), etc. Configuration parameters 210 may also be stored in storage system 206. Recommender system 106 may also be coupled to (or include) a network interface 204 for communicating with nodes in network 110 or devices connected to network 110. In some embodiments, computer program 208 is configured such that when processing system 202 executes computer program 208, processing system 202 is configured to perform steps described below with reference to the flow charts shown in FIGS. 4-8. In other embodiments, data processing system 202 is configured to perform steps described below in FIGS. 4-8 without the need for software 208. That is, for example, data processing system 202 may consist merely of one or more ASICs. Hence, the features of the present invention described above may be implemented in hardware and/or software.

Figure 3:
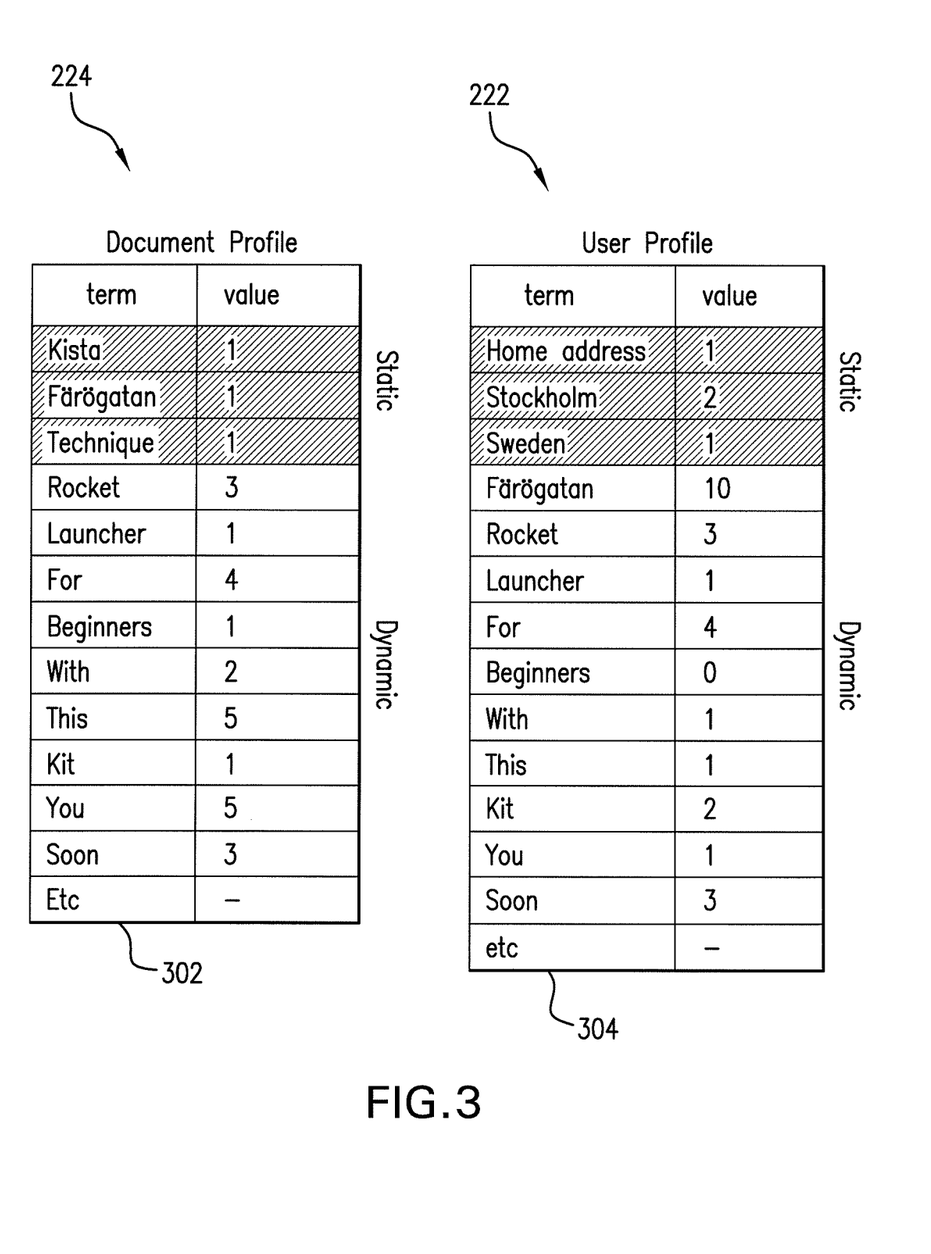
FIG. 3 illustrates an example document vector and an example user vector.

As further shown in FIG. 2, data storage system 206 may store a set of documents 220, a document profile 224 for each document included in set 220, and user profiles 222. FIG. 3 illustrates an example document profile 224 that corresponds to a particular document in set 220 and an example user profile 222 that corresponds to a particular user of system 100. In the examples shown, document profile 224 consists of a document vector 302 and user profile 222 consists of a user vector 304, nevertheless, profiles 222 and 224 may contain other information.

Also, in the examples shown, document vector 302 contains a set of records where each records stores an ordered pair and user vector 304 contains a set of records where each record stores ordered pair. In both vectors 302 and 304, for each ordered pair, one of the items of the ordered pair is a term (e.g., a set of one or more words) and the other item of the ordered pair is a value corresponding to the term. Accordingly, each vector record includes a term field and a value field. For example, document vector 302 includes the terms "rocket", "launcher" and "beginners" and includes a value for each term. Specifically, the document vector 302 includes the values 3, 1 and 1, which correspond to the terms "rocket", "launcher" and "beginners," respectively. As further shown, document vector 302 and user vector 304 may have a "static" portion and a "dynamic" portion.

For user vector 304, the static portion may contain terms associated with the user corresponding to the vector that do not change often (e.g., demographic information about the corresponding user), while the terms included in the dynamic portion may be a function of the documents recommender system 106 has selected for the user. For document vector 302, the dynamic portion may contain the terms found in the document corresponding to the vector, while the static portion may contain other terms associated with the document. For example, if the corresponding document is an advertisement for a rocket launcher being sold by a particular seller, the static portion of document vector 302 may include such terms as: the name of the seller, the city where the seller is located, a category name corresponding to a product category, etc.

In some embodiments, the value corresponding to a particular term in the dynamic portion of document vector 302 represents the number of times the term appears in the document corresponding to document vector 302. In other embodiments, the value corresponding to a particular term may represent another characteristic of the term (e.g., the importance of the term in the document, which may be a function of the number of times the term appears in the document).

As described herein, recommender system 106 uses document vectors 302 and user vectors 304 to select documents and/or users. For example, given a particular user that has a corresponding user vector 304, recommender system 106 compares the user's user vector 304 (or a vector derived there from) to each of set of document vectors 302 (or vector derived there from) to select from a set of candidate documents (e.g., document set 220) a document that has a high likelihood of being acted on positively by the user (i.e., a document that has a high likelihood of being rated highly by the user, explicitly or implicitly). Likewise, given a particular document having a corresponding document vector 302, recommender system 106 compares the document vector 302 to each of set of user vectors 304 to select from a set of candidate users a user that has a high likelihood of rating the document highly.

An advantageous feature of recommender system 106 is its ability to automatically update each user's user vector 304 based on (i) the document vectors 302 corresponding to the documents provided to the user by document server 102 and (ii) the action or actions a user takes with respect to the documents.

Figure 4:
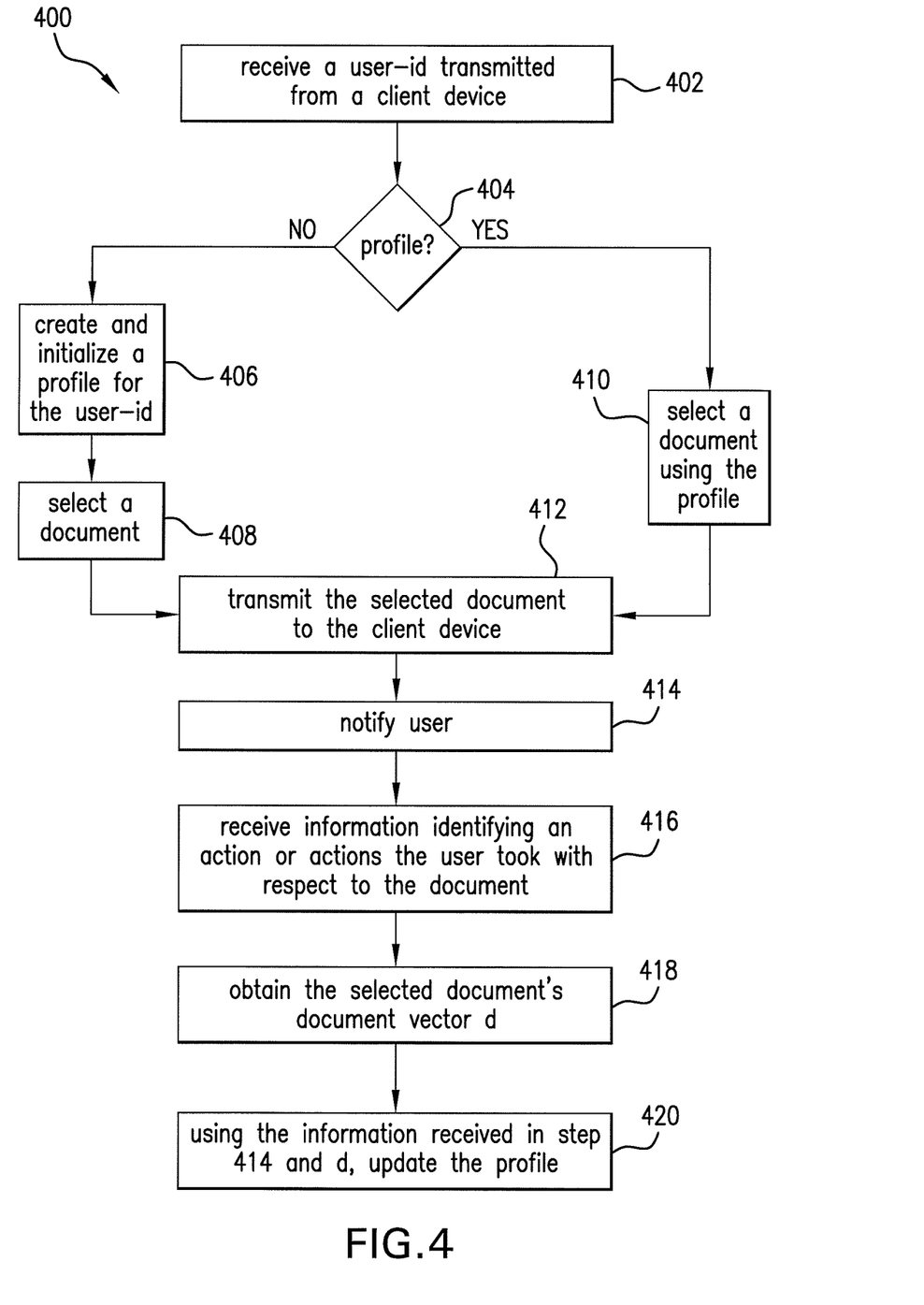
FIGS. 4-8 are flow charts illustrating various processes according to some embodiments of the invention.
Figure 6:
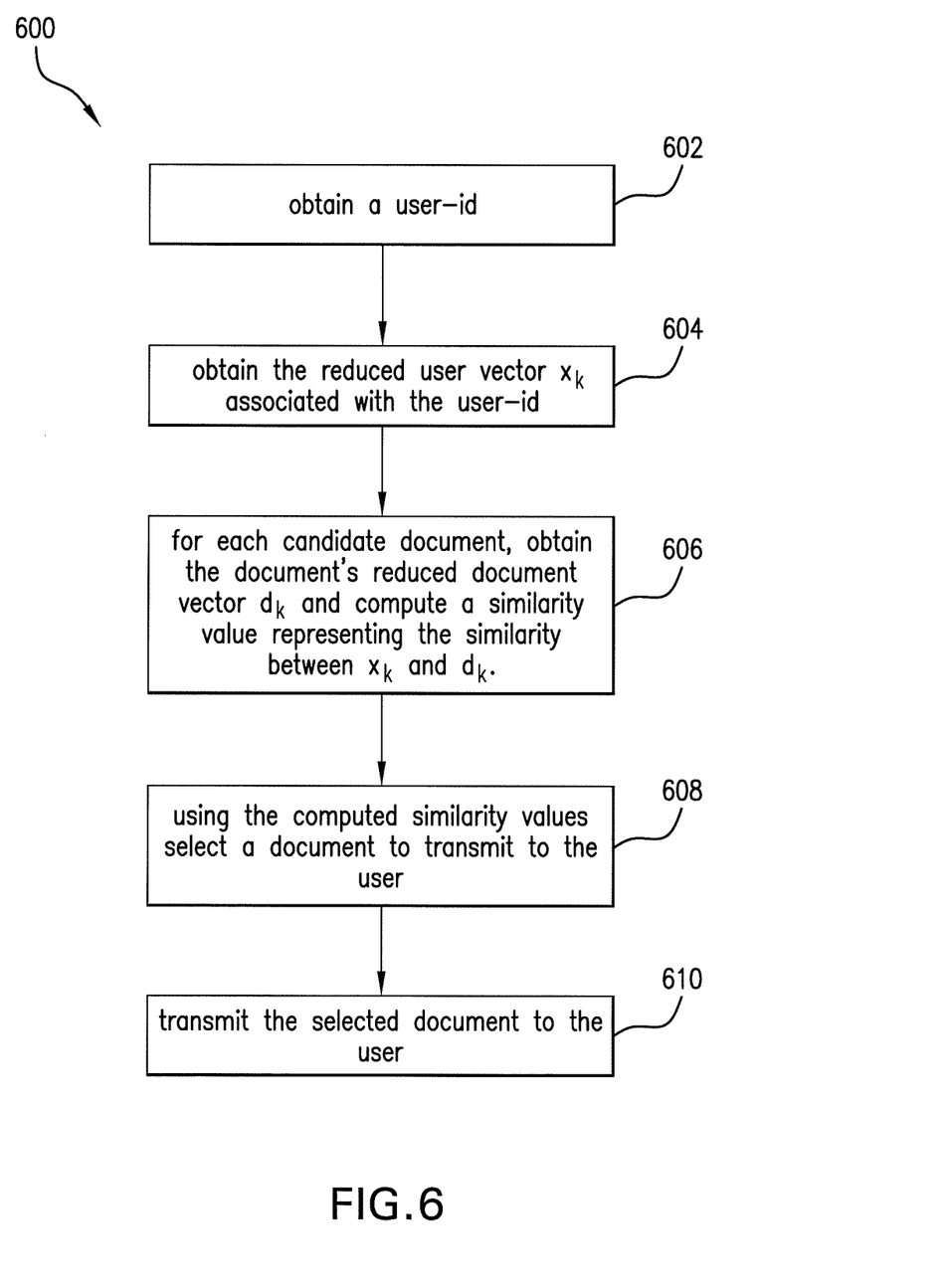

Referring now to FIG. 4, FIG. 4 is a flow chart illustrating a process 400 for automatically updating a user's user vector 304. Process 400 may begin in step 402, where document server 102 receives from the user a user identifier ("user-id") uniquely associated with the user. For example, in step 402 the user may operate a client device 104 that transmits the user-id to server 102 via network 110. In step 404, recommender system 106 determines whether the set of user profiles 222 includes a user profile associated with the user. If no such profile exists, process 400 proceeds to step 406, otherwise it proceeds to step 410, where a document is selected using the user profile associated with the user. A process for performing step 410 is shown in FIG. 6 and described further herein.

In step 406, recommender 106 creates and initializes a user profile and associates this user profile with the user-id. Creating and initialized the user profile may include or consists of creating an initializing a user vector. Additionally, this step may include requesting the user to input information about the user (e.g., demographic information or other information), receiving the inputted information, and storing the inputted information in the user profile. Next (step 408) recommender 106 selects a document. If recommender 106 has no information about the user at this point, then the step of selecting a document may simply consist of randomly selecting a document or selecting the next document in the queue.

In step 412, document server 102 transmits the selected document to the user. Transmitting the selected document to the user may consist of transmitting the document to the client device the user is operating or placing the document in a mailbox associated with the user by, for example, transmitting the document to a mail server.

Next (step 414), the user is notified of the incoming document. After being notified, the user may take some action or actions. For example, the user could open the document, delete the document, ignore the document, forward the document, or perform some combination of these actions as well as other actions. For example, the user could (A) open the document and then delete the document after reading it, (B) open the document and then use the document (e.g., activate a hyperlink or other element included in the document), (C) ignore the document initially and then open the document, etc. The user's client device is configured to transmit to document server 102 information identifying the action or actions the user took with respect to the document.

Next (step 416), document server 106 receives the information identifying the action or actions the user took with respect to the document. The information identifying the action or actions the user took with respect to the document may be a value or string that is mapped to a particular action or actions, using, for example a look-up table (see e.g., Table 1, below). Next (step 418) the document's document vector is retrieved (if not already retrieved). Next (step 420), recommender 106 uses the document's document vector and the information received in step 416 to update the user's profile.

Figure 5:
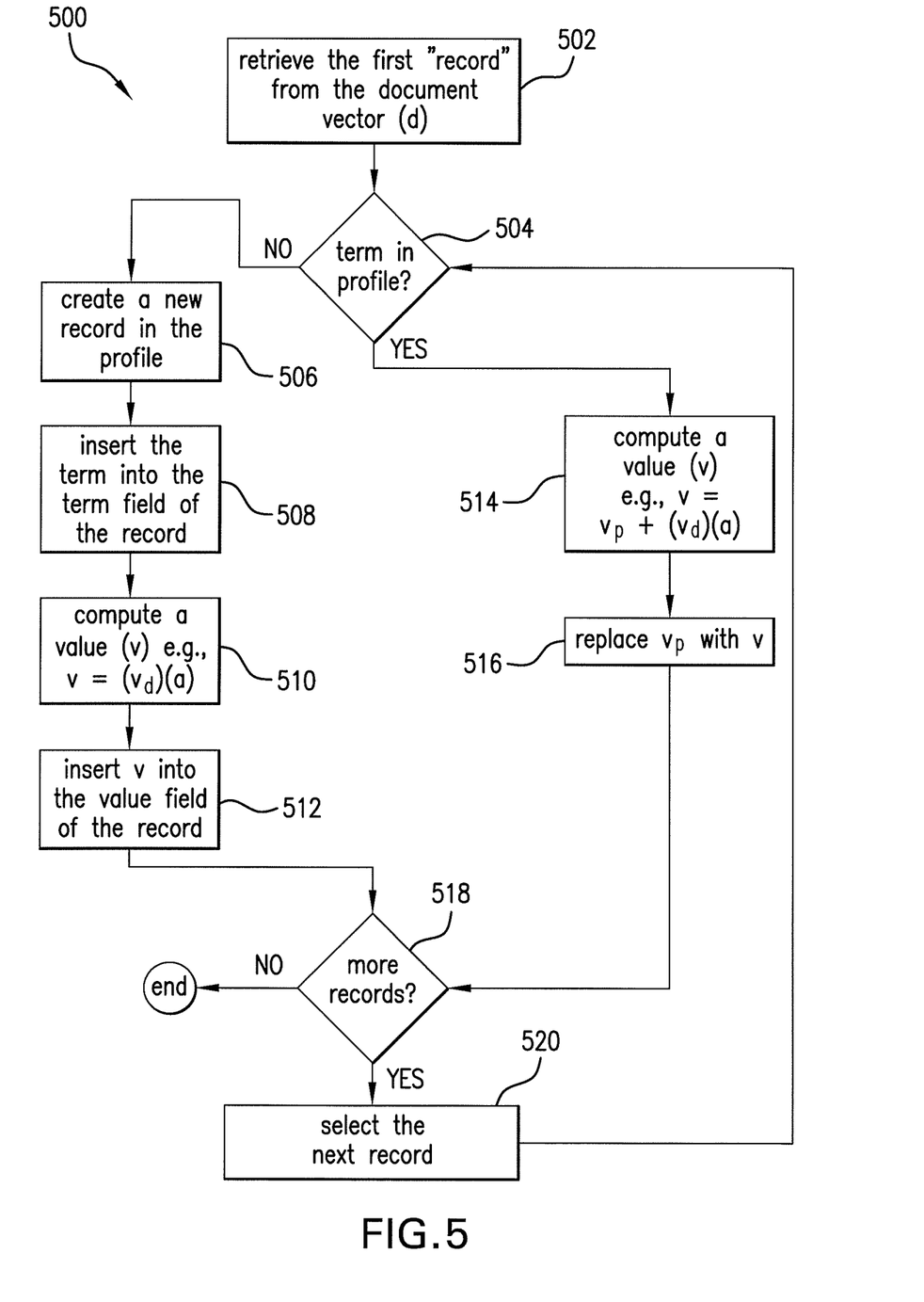

Referring now to FIG. 5, FIG. 5 is a flow chart illustrating a process 500 for implementing step 420. Process 500 may begin in step 502, were the first record from the document's document vector is selected. Next (step 504), a determination is made as to whether the term included in the term field of the selected record is found in a term field of the user's user vector. If so, process 500 proceeds to step 514, otherwise it proceeds to step 506. In step 506, a new record is added to the user vector. Next (step 508), the term that is stored in the term field of the selected record is inserted into the term field of the record added to the user vector.

Next (step 510), a value v is computed. For example, v may be equal to $v_d$ multiplied by the value a, where $v_d$ is the value stored in the value field of the selected record from the document vector and a is a value that is a function of the action or actions the user took with respect to the document. For example, if the user discarded the document, then the value a may be equal to −2, whereas if the user opened and used the document, then the value a may be equal to +2. For the sake of illustration, table 1 below shows how the value a can be manned to actions.

TABLE 1

| ACTION 1 | ACTION 2 | VALUE a |
|---|---|---|
| Open | Use | 2 |
| Disregard | Use | 1 |
| Open | Disregard | 0 |
| Disregard | Disregard | −1 |
| Discard | | −2 |

Next (step 512), the value v is inserted into the value field of the new record added to the user vector.

In step 514, a value v is computed. For example, v may be set equal to $(v_d)(a)+v_p$, where $v_p$ is the value stored in the value field of the user vector record that stores the same term that is stored in the term field of the selected document vector record. Next (step 516), the value field of this user vector record is set equal to v (i.e., $v_p$ is replaced with v).

In step 518, a determination is made as to whether there are more records in the document vector. If not, the process ends, otherwise the process proceeds to step 520, were the next record from the document vector is selected. After step 520, the process returns to step 504.

As can be seen from FIGS. 4 and 5, a user vector is created using only implicit document ratings. This is advantageous because it does not require the user to manually rate documents, which is a task that may difficult to get users to undertake. Another advantage is that a user's behavior and preferences, which might change over time, will be reflected in the user's vector as the user's vector is automatically updated. Moreover, the system creates a potential of matching documents with users in the same vector space. By combining the user ratings of all documents and the contents of all documents it becomes possible to make a prediction of the user's likely future rating of other documents even though the documents are not identical. An advertiser can make use of this system in order to find the most potential users for a campaign. This may lead to better targeted and more focused campaign. A more focused ad campaign may lead to less money having to be spent because fewer user's will be the target of the campaign. In other words, embodiments of the invention can be used to reduce the need for mass spamming of advertising messages.

Referring now to FIG. 6, FIG. 6 is a flow chart illustrating a process 600 for selecting a document to provide to a particular user. Process 600 may be used to implement step 410 of process 400. Process 600 may begin in step 602, where recommender 106 obtains the user's user-id. Next (step 604), recommender 106 obtains a reduced vector ($x_k$) associated with the user-id. For example, in step 602, recommender 106 may use the user-id to retrieve the user's user profile, which, as discussed above, may contain a user vector 304, which we shall denote as x. After obtaining the user profile containing the user vector x, recommender 106 may form $x_k$ using x. A process for forming $x_k$ from x is described below with reference to FIG. 8.

Next (step 606), recommender 106 performs the following two steps for each document included in a set of candidate documents: (1) recommender 106 obtains the document's reduced document vector $d_k$ and (2) recommender 106 computes a similarity value representing the similarity between $x_k$ and $d_k$. A method for producing a reduced document vector $d_k$ for a document is described below with reference to FIG. 8. The step of computing a similarly value may comprise or consist of determining the angle or the cosine of the angle between the two vectors, but other techniques for comparing vectors may also be used.

Next (step 608), recommender 106 uses the computed similarity values to select a document from the candidate set of documents. For example, in step 608, recommender may use the similarity values to determine the "best" document to select, where the "best" document may be defined as the document whose reduced document vector is most similar to the user's reduced user vector.

Next (step 610), document server 102 "transmits" the selected document to the user. For example, in some embodiments, document server 102 may place the selected document in one of the user's mailboxes. When this occurs, the user may receive a notification of this event. As described above, the user may then choose to, among other things, ignore the document or retrieve and open the document. In other embodiments, the step of transmitting the document to the user may include transmitting the document directly to the user's client device 104 using, for example, a messaging protocol (e.g., a short message service (SMS) protocol or other protocol). As described above, values in the user's user vector can be changed based on the actions the user takes with respect to the document.

Figure 7:
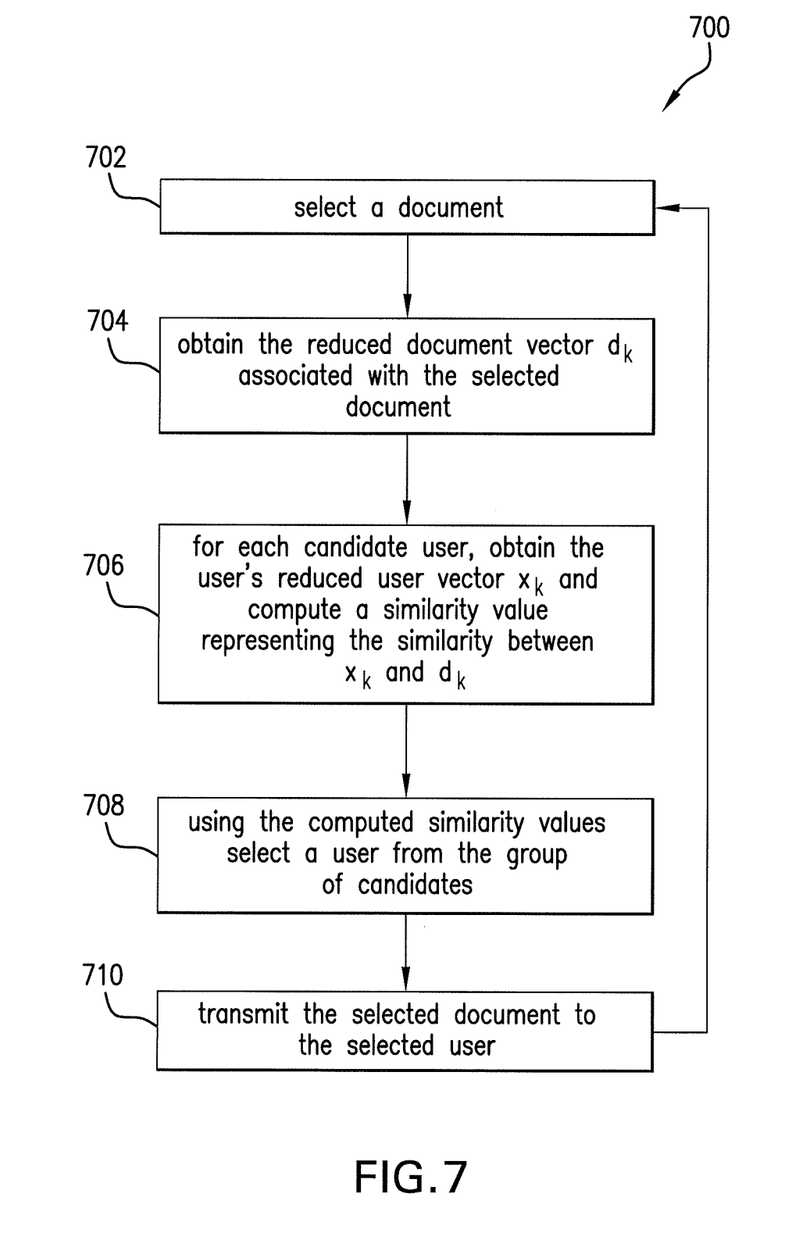

Referring now to FIG. 7, FIG. 7 is a flow chart illustrating a process 700 for selecting a user to receive a particular document. Process 700 may begin in step 702, where a particular document is selected. Next (step 704), recommender 106 obtains a reduced document vector $d_k$ corresponding to the selected document. Next (step 706), recommender 106 performs the following two steps for each user included in a set of candidate users: (1) recommender 106 obtains a reduced user vector $x_k$ corresponding to the user and (2) recommender 106 computes a similarity value representing the similarity between $x_k$ and $d_k$. Next (step 708), recommender 106 uses the computed similarity values to select a user from the candidate set of users. For example, in step 708, recommender may use the similarity values to determine the "best" user to select, where the "best" user may be defined as the user whose reduced user vector is most similar to the reduced document vector corresponding to the selected document. Next (step 710), document server 102 transmits the selected document to the selected user.

Figure 8:
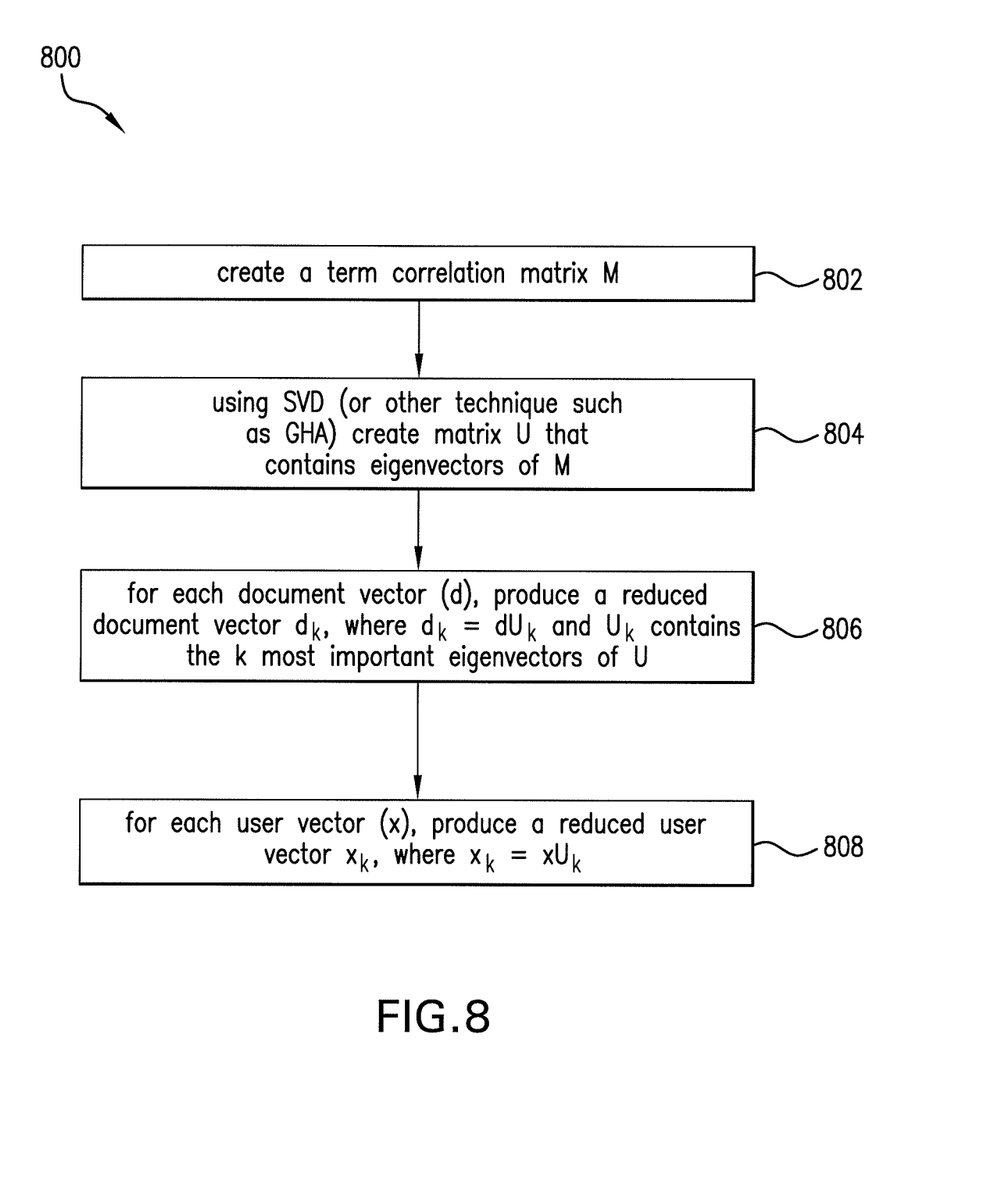

Referring now to FIG. 8, FIG. 8 is a flow chart illustrating a process 800 for producing reduced user vectors and reduced document vectors. Dimension reduction can be done using well known techniques within natural language processing (NLP). The flow chart of FIG. 8 illustrates one way. Process 800 may begin in step 802, where a term correlation matrix M is created using document set 220. That is, M describes word correlations within all the documents included in set 220. Mathematically, $M=D^TD$, where D is a matrix of document vectors 302. Next (step 804), a matrix U is created that contains eigenvectors of M. The matrix U may be created using well known Singular Value Decomposition (SVD) or Generalized Hebbian Algorithm (GHA). Next (step 806), the following two steps are performed for each document in set 220: (1) the document vector d corresponding to the document is retrieved and (2) a reduced document vector $d_k$ is computed, where $d_k=dU_k$, where $U_k$ contains the k most important eigenvectors of U. Next (step 808), the following two steps are performed for each user profile in set 222: (1) the user vector x contained in the user profile is retrieved and (2) a reduced user vector $x_k$ is computed, where $x_k=xU_k$.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a document server for updating and/or creating a user profile associated with a user of a client device, wherein the document server comprises a recommender system, the method comprising:
   (i) transmitting, from the document server to the user, a document containing a set of terms, including a first term and a second term, wherein a document profile corresponding to the document associates the first term with a first term value (vd1) and associates the second term with a second term value (vd2):
   (ii) after step (i), receiving, at the document server, information identifying a set of two or more actions the user of the client device took with respect to the document, wherein the set of user actions is mapped to an action value
   (iii) in response to receiving the information, determining, for each term included in the set of terms, a value (v) to associate with the term and associating the determined value (v) with the term, thereby establishing a set of term/value pairs, where each said pair consists of one of said terms and its associated value (v), wherein said determining step comprising determining a first value (v1) for said first term of the document, and determining the first value (v1) for the first term of the document comprises obtaining the action value (a) mapped to the set of actions the user took with respect to the document and then calculating the first value (v1) using the obtained action value (a) and the first term value (vd1); and
   (iv) storing the set of term/value pairs in the user profile.

2. The method of claim 1, wherein the document contains not only the set of terms but also a second set of terms, and the document is an advertisement.

3. The method of claim 1, wherein the first term, value (vd1) equals the number of times the first term appears in the document.

4. The method of claim 3, wherein
   prior to step (iii), the user profile contains a value (vp) associated with the second term, and
   said determining step comprising determining a second value (v2) for said second term of the document and determining the second value (v2) for the second term of the document comprises calculating the second value (v2) using the values: vp, a, and vd2.

5. The method of claim 4, wherein calculating v2 using vp, a and vd2 comprises calculating (vp)+(a)(vd2).

6. The method of claim 1, wherein the information identifying the pair of actions comprises a string, wherein the string is mapped to the pair of actions.

7. The method of claim 1, wherein the step of transmitting the document to the user comprises (1) transmitting an e-mail containing the document to an e-mail address associated with the user or (2) transmitting the document directly to the client device.

8. A document serving system for creating and/or updating a user vector associated with a user, comprising:

a data processing system;

a data storage system accessible to the data processing system; and a network interface coupled to a network, said data processing system being configured to:
(i) transmit to a user, via the network interface and the network, a document containing a set of terms, including a first term and a second term, wherein a document vector corresponding to the document associates each term included in the set of terms with a term value (vd) such that the first term is associated with a first term value (vd1) and the second term is associated with a second term value (vd2);
(ii) receive information identifying two or more actions the user took with respect to the document, the received information being mapped to an action value (a);
(iii) determine the action value (a) to which said received information is mapped;
(iv) establish a set of term/value pairs in response to receiving the information, wherein the data processing system is configured to establish the set of term/value pairs by determining, for each term included in the set of terms, a value (v) to associate with the term, said value (v) being a function of the determined action value (a) and the term value (vd) associated with said term in the document vector; and
(v) store in the data storage system the set of term/value pairs such that the set of term/value pairs is associated with the user.

9. The document serving system of claim 8, wherein fee-each term value for a term equals the number of times the term appears in the document.

10. The document serving system of claim 9, wherein the data storage system stores a value (vp) associated with the user and with the first term, and
the value determined for the first term is a function of said value stored in the data storage system (vp), the determined action value (a), and the first term value (vd1) which equals the number of times the term appears in the document.

11. The document serving system of claim 10, wherein the data processing system is configured to determine the value for the first term by computing vp+(vd1)(a).

12. A non-transitory computer-readable storage medium storing a computer program comprising computer readable code means which when executed by a processor causes the processor to perform the steps of:
(i) using a network interface to transmit to a user a document containing a set of terms, including a first term and a second term, wherein a document profile corresponding to the document associates the first term with a first term value (vd1) and associates the second term with a second term value (vd2);
(ii) in response to receiving information identifying two or more actions the user took with respect to the document, determining, for each term included in the set of terms, a value to associate with the term, thereby establishing a set of term/value pairs, where each said pair consists of one of said terms and its associated value; and
(iii) storing the set of term/value pairs in a profile associated with the user, wherein said determining step comprising determining a first value (v) for said first term of the document, and determining the first value (v) for the first term of the document comprises obtaining an action value (a) mapped to the actions the user took with respect to the document and then calculating the first value (v) using the obtained action value fa) and the first term value (vd1).

13. The storage medium of claim 12, wherein the first term value (vd1) equals the number of times the first term appears in the document.

14. The storage medium of claim 13, wherein a user profile associated with the user contains a value (vp1) associated with the second term, and
said determining step comprising determining a second value (v2) for said second term of the document and determining the second value (v2) for the second term of the document comprises calculating the second value (v2) using the values: vp, a, and vd2.

15. The storage medium of claim 14, wherein the step of determining the value for the second term comprises computing: vp+(vd2)(a).

16. The method of claim 1, wherein calculating the first value (v1) using the obtained action value (a) and the first term value (vd1) comprises calculating: (a)(vd1).

17. The method of claim 16, wherein the user profile includes a static portion and a dynamic portion, said static portion of the user profile comprising demographic information about the user.

18. The method of claim 17, wherein the dynamic portion comprises said set of term/value pairs.

19. The method of claim 18, wherein the first term value (vd1) is a function of the number of times the first term appears in the document.

20. The method of claim 1, wherein the method further comprises performing the following steps prior to transmitting the document to the user:
obtaining a reduced user vector based on the user profile;
obtaining the document profile associated with the document;
comparing the reduced user vector with the document vector to produce a similarity value; and
determining that a reference to the document should be transmitted to the user based on the similarity value.

21. The method of claim 20, wherein comparing the reduced user vector with the document profile comprises determining a value that is a function of the angle between the reduced vector and a document vector contained within the document profile.

* * * * *